UNITED STATES PATENT OFFICE.

GADIENT ENGI, OF BASEL, SWITZERLAND, ASSIGNOR TO FIRM OF SOCIETY OF CHEMICAL INDUSTRY IN BASLE, OF BASEL, SWITZERLAND.

PROCESS OF MAKING A RED VAT-DYEING DYE.

No. 831,844. Specification of Letters Patent. Patented Sept. 25, 1906.

Application filed March 22, 1906. Serial No. 307,409.

*To all whom it may concern:*

Be it known that I, GADIENT ENGI, chemist, a citizen of the Swiss Republic, and a resident of Basel, Switzerland, have invented a new and useful Process for the Manufacture of a Red Vat-Dyeing Dyestuff, of which the following is a full, clear, and exact specification.

In the inaugural dissertation of G. Müller, "*Ueber Schwefelhaltige Analoga der Indigogruppe,*" (Zürich, 1905,) is described the preparation of a dyestuff containing sulfur by heating salicylthioacetic acid,

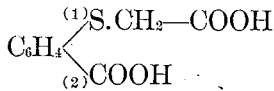

(called by Müller "phenylthioacetic - carboxylic acid,") or its dimethyl ester with caustic-soda lye at a high temperature and subsequently oxidizing with potassium ferricyanid. The dyestuff thus obtained may be regarded as having the constitution of indigo, in which sulfur takes the place of the imido groups.

I have found that the dyestuff described by Müller, which is obtainable only in small quantity by the procedure he prescribes, may be manufactured on a sufficiently large scale for commerce by heating salicylthioacetic acid not with caustic-soda lye, but in presence of an organic solvent or diluent which yields oxygen, such as an aromatic nitrohydrocarbon, the finished dyestuff being thus obtained in one operation, since it may be separated in a pure form by cooling the mixture. This manufacture forms the subject-matter of this invention and is illustrated by the following examples:

Example I: Ten parts, by weight, of salicylthioacetic acid are boiled with fifty parts of nitrobenzene in a reflux apparatus, whereby the solution gradually becomes deep-blue red. The boiling having been continued for about five hours, the mixture is cooled, and the dyestuff, which has separated in the form of beautiful lustrous brown-red crystals, is filtered and washed with alcohol to remove the adhering nitrobenzene. In this manner the dyestuff is obtained in a very pure condition.

Example II: One part, by weight, of the salicylthioacetic acid is heated with one part of a dinitrotoluene and four parts of diphenylamin for three to four hours at 210° to 220° centigrade. The cooled mixture is extracted with hot alcohol, whereby the red dyestuff is obtained in a pure condition without further treatment in the form of red-brown needles having alcohol in them.

Instead of the nitro compounds specified in Examples I and II may be used with like result other nitro compounds, such as ortho or para nitrotoluene or dinitrobenzene, and instead of diphenylamin another indifferent solvent may be used without essentially affecting the final result.

The dyestuff manufactured as described is identical with that produced by G. Müller and when dried is a bluish-red powder which is insoluble in water and cold alcohol. In boiling alcohol it dissolves only slightly to a violet-red solution. In hot benzene it dissolves more freely to a beautiful carmin-red solution having a brilliant yellowish-red fluorescence. The solution in strong sulfuric acid is bluish green, and dilution of the solution with water precipitates the unchanged dyestuff as blue-red flocks. The dyestuff can easily be worked up into a vat with aid of a reducing agent, such as sodium hydrosulfite, and this clear yellow vat dyes cotton without a mordant when applied in a suitable manner, the tint developed on the cotton when it is subsequently exposed to the air being blue red. The dyeings are absolutely fast to washing and to light, and, moreover, are advantageously fast to chlorin.

What I claim is—

1. The herein-described process for the manufacture of a red vat-dyeing dyestuff, which consists in heating salicylthioacetic acid

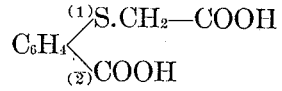

in presence of an aromatic nitrohydrocarbon.

2. The herein-described process for the manufacture of a red vat-dyeing dyestuff, which consists in heating salicylthioacetic acid

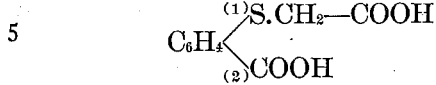

in presence of an aromatic nitrohydrocarbon with addition of an indifferent solvent.

In witness whereof I have hereunto signed my name, this 8th day of March, 1906, in the presence of two subscribing witnesses.

GADIENT ENGI.

Witnesses:
 GEO. GIFFORD,
 AMAND RITTER.